US008331338B2

(12) United States Patent
Stählin et al.

(10) Patent No.: US 8,331,338 B2
(45) Date of Patent: Dec. 11, 2012

(54) EMERGENCY CALLING DEVICE FOR A VEHICLE

(75) Inventors: Ulrich Stählin, Eschborn (DE); Marc Menzel, Marburg (DE); Robert Gee, Lake Barrington, IL (US)

(73) Assignee: Continental Teves AG & Co. oHG (DE)

( * ) Notice: Subject to any disclaimer, the term of this patent is extended or adjusted under 35 U.S.C. 154(b) by 300 days.

(21) Appl. No.: 12/674,982

(22) PCT Filed: Aug. 27, 2008

(86) PCT No.: PCT/EP2008/061214

§ 371 (c)(1),
(2), (4) Date: Jul. 27, 2010

(87) PCT Pub. No.: WO2009/027427

PCT Pub. Date: Mar. 5, 2009

(65) Prior Publication Data

US 2010/0284382 A1 Nov. 11, 2010

(30) Foreign Application Priority Data

Aug. 29, 2007 (DE) ......................... 10 2007 040 972
Aug. 27, 2008 (DE) ......................... 10 2008 039 831

(51) Int. Cl.
*H04W 4/00* (2009.01)
*H04M 11/04* (2006.01)

(52) U.S. Cl. .................................... 370/338; 455/404.1

(58) Field of Classification Search ........................ None
See application file for complete search history.

(56) References Cited

U.S. PATENT DOCUMENTS

| | | | | |
|---|---|---|---|---|
| 6,147,598 | A | 11/2000 | Murphy et al. | |
| 7,091,829 | B2 * | 8/2006 | Lee | 340/286.12 |
| 7,761,544 | B2 * | 7/2010 | Manasseh et al. | 709/223 |
| 2004/0184584 | A1 * | 9/2004 | McCalmont et al. | 455/412.1 |
| 2005/0003797 | A1 * | 1/2005 | Baldwin | 455/404.1 |
| 2005/0282518 | A1 * | 12/2005 | D'Evelyn et al. | 455/404.1 |
| 2007/0142028 | A1 * | 6/2007 | Ayoub et al. | 455/404.1 |
| 2007/0152804 | A1 * | 7/2007 | Breed et al. | 701/301 |
| 2010/0046489 | A1 * | 2/2010 | Dickinson et al. | 370/338 |

FOREIGN PATENT DOCUMENTS

| | | |
|---|---|---|
| EP | 1 814 093 | 8/2007 |
| WO | WO 2005/085021 | 9/2005 |

OTHER PUBLICATIONS

International Search Report for PCT/EP2008/061214 dated Nov. 25, 2008.

* cited by examiner

*Primary Examiner* — Anh-Vu Ly
(74) *Attorney, Agent, or Firm* — RatnerPrestia

(57) ABSTRACT

A network-based emergency call device for a vehicle. A first connection between the vehicle and a server is firmly prescribed as a permanent IP connection. This connection is used to send an emergency call, together with the necessary emergency call data to the server. The latter forwards the emergency to all the registered assistance units via further connections directly and without human action. The assistance unit providing assistance is selected automatically by taking the emergency call by an assistance unit. The subsequent setup of a communication link between the assistance unit taking the call and the vehicle involves the use of the already existing IP connection between the vehicle and the server for the communication link which is to be set up. The data to be transmitted and the data rate can also be customized to the current situation of the vehicle and to the surroundings of the vehicle.

12 Claims, 3 Drawing Sheets

EMERGENCY CALLING DEVICE FOR A VEHICLE

CROSS REFERENCE TO RELATED APPLICATIONS

This application is the U.S. national phase application of PCT International Application No. PCT/EP2008/061214, filed Aug. 27, 2008, which claims priority to German Patent Application No. DE 10 2007 040 972.0, filed Aug. 29, 2007, and German Patent Application No. DE 10 2008 039 831.4, filed Aug. 27, 2008, the contents of such applications being incorporated herein by reference.

FIELD OF THE INVENTION

The invention relates to emergency-call and safety engineering for vehicles. In particular, the invention relates to an emergency call device for a vehicle for the network-based transmission of an emergency call, an emergency call system, the use of an emergency call device in a vehicle, a vehicle having an emergency call device, a method, a program element and a computer-readable medium.

BACKGROUND OF THE INVENTION

Vehicle emergency call systems have been known for a relatively long time. For the automated sending of an emergency call (Ecall), transmission units are placed in vehicles in order to automatically dial a standard number, for example the European emergency call number 112 or 911 in the USA, in the event of an accident. Additionally, further service providers may be involved in the line of communication of an emergency call.

Usually, the information about the accident is sent by the vehicle to a public safety answering point (PSAP), which is manned and which centrally assigns the rescue task to an ambulance which is currently in the vicinity of the accident location. In this case, the public safety answering point resorts to a firmly prescribed database which stores the data for the ambulances.

In addition, for the most part, standardized fully digital mobile radio networks, such as the Global System for Mobile Communications (GSM), are used for the data transmission between the vehicles which are equipped with Ecall, the public safety answering point and possible assistance, such as paramedics. In addition, the geographical position of the accident is found by virtue of Geodata being transmitted using satellite navigation systems such as the Global Positioning System (GPS) or generally a Global Navigation Satellite System (GNSS). This ensures that the accident location is found quickly. This involves a predefined data record being transmitted to the public safety answering point.

SUMMARY OF THE INVENTION

It is an object of the invention to provide an improved emergency call for vehicles.

The invention specifies an emergency call device for a vehicle for the network-based transmission of an emergency call, an emergency call system, a use, a method, a program element and a computer-readable medium in accordance with the features of the independent claims. Developments of the invention an be found in the subclaims. The exemplary embodiments described relate in equal measure to the emergency call device, the emergency call system, the use, the vehicle, the method, the program element and the computer-readable medium.

It should be pointed out that the following definitions and abbreviations are used within the context of the invention.

Emergency Call:

This is intended to be understood to mean either an automated emergency call (Ecall) or an automated technical service call (Breakdown Call, Bcall). In addition, it may also be used to mean any other communication within an information service.

Connection/Link

This can be understood to mean any physical connection which allows data to be interchanged between a transmitter and a receiver.

Assistance Unit:

Within the context of the invention, the term assistance unit can be understood to mean either any medical assistance service, such as a rescue vehicle, or any technical assistance service, such as the Allgemeine Deutsche Automobil Club (ADAC), local repair shops, mobile service or other medical or technical assistance facilities which can assist the user of the vehicle in the event of an accident or a technical breakdown.

In line with one exemplary embodiment of the invention, an emergency call device for a vehicle for the network-based transmission of an emergency call to assistance units is specified. In this case, the emergency call device has an interface for setting up a connection to a server, and also a transmission unit for transmitting emergency call data to the server via the connection. In this context, the connection is a permanent IP connection and the network interface is also designed to set up a communication link to an assistance unit via the server in the event of said emergency call being taken by said assistance unit. In addition, the communication link uses the already existing IP connection between the emergency call device and the server.

The already existing IP connection between the vehicle and the server, which can be permanently maintained during the emergency call, allows faster setup of the communication link between the assistance unit which has taken the emergency call and the vehicle. Routing by the server can be dispensed with. The use of the existing IP connection therefore dispenses with the otherwise necessary setup time for a voice connection, for example. In addition, the direct connection to the assistance units dispenses with the need for a switching point which needs to be manned. A faster, more efficient, less expensive and less error-prone automated emergency call is therefore possible.

When an automated emergency call is transmitted to the emergency call server using a transmission unit in the emergency call device, not only the emergency call but also the necessary data such as position, seriousness of the accident, nature of the accident and, by way of example, individual data about the occupants are transmitted to the emergency call server via the IP connection. The server in turn fully automatically transmits the emergency call to the free assistance units in the vicinity. The free assistance units can therefore be preselected by the server. In this case, the server operates in fully automated fashion. The individual connections between the server and the respective rescue units may be any desired physical connection for the interchange of data, such as an IP connection or a GSM radio link. When an assistance unit takes the emergency call, a connection, e.g. a voice connection, is set up from the rescue unit taking the call to the vehicle via the server. At least that portion of the communication link which is situated between the vehicle and the server uses the still existing IP connection between the vehicle and the server for this. Routing by the server is therefore not necessary and the set up time and susceptibility to error can be reduced. By way of example, a Voice-over-IP connection can be set up in the already existing IP connection.

In addition, it is likewise possible for any assistance unit to maintain its respective connection to the server for the purpose of optimizing the setup time.

In line with a further exemplary embodiment of the invention, the communication link has a first and second section. In this case, the first section exists between the emergency call device and the server, and the second section exists between the server and the assistance unit taking the emergency call. At least the first section of the communication link is a Voice-over-IP connection.

In other words, an automated emergency call of this kind involves the vehicle setting up an IP connection to the server and transmitting the necessary data to the server. If a rescue vehicle takes the emergency call, a voice connection is set up thereto using Voice-over-IP. Since both the vehicle and the server are already logged on in the network and there is an IP connection between the vehicle and the server, a Voice-over-IP connection can be set up without any technical complexity and without further loss of time.

In line with a further exemplary embodiment of the invention, the transmission of the emergency call to the assistance units requires no public safety answering point. Similarly, the assistance unit taking the emergency call is selected by the direct, independent taking of the emergency call by the assistance unit.

The direct connection to the assistance units dispenses with the need for a switching point, such as a public safety answering point, which needs to be manned. It is thus possible to save costs and to avoid sources of error. Similarly, the automatic selection of the assistance unit which can provide assistance and takes the emergency call can mean that erroneous assignment by the public safety answering point is avoided.

In line with a further exemplary embodiment of the invention, the emergency call data are selected from the group comprising the current and historical position of the vehicle, the nature of an accident, the seriousness of an accident, the time of an accident, the number of occupants, individual information from the occupants, biometric information, information relating to a technical fault, error diagnosis information, and measured values from sensors in the vehicle.

In other words, the emergency call can be followed by assistance which is individually customized to the present case. That assistance unit which has the necessary elements for providing optimum assistance can use the transmitted data to decide to take the emergency call. The historical position can be provided later by means of previous recording of the positions of the vehicle. This allows an increase in safety should the position-finding unit fail, for example.

In line with a further exemplary embodiment of the invention, the nature of the emergency call data and the parameters of the technical transmission of the emergency call data have been customized to supplementary information. In this case, the supplementary information corresponds to the external surroundings of the vehicle.

Within this context, the external surroundings of the vehicle include not only the physical and meteorological ambient conditions and the static traffic circumstances, such as road profiles, but also the information landscape formed by other vehicles and by an infrastructure through communication with the vehicle. Similarly, the external surroundings include measured values which are ascertained by a detection unit in the vehicle.

In this case, this exemplary embodiment of the invention may relate not just to emergency call data but also to general data, and vehicle-to-vehicle communication or vehicle-to-infrastructure communication is also possible with this exemplary embodiment of the invention. The infrastructure may be a server within this context, for example. The emergency call device is therefore a communication unit. This situation-dependent transmission of data can likewise be used to reduce the transmitted data rate and the transmitted volume of data in standard situations which do not involve an emergency call.

In other words, a communication unit for a first vehicle for transmitting data between the first vehicle and a second vehicle or between the first vehicle and an infrastructure is specified. In this case, the communication unit has a transmission unit, a memory unit and a computation unit. In addition, the memory unit is designed to supply supplementary information. In addition, the computation unit is designed to customize the nature of the data and customize technical parameters of the transmission on the basis of the supplementary information. Within this context, the supplementary information corresponds to the external surroundings of the first vehicle.

When the supplementary information is supplied, the memory unit is provided with those data from a detection unit, for example, by the second vehicle or by an infrastructure, on the basis of which the computation unit customizes the parameters of the transmission, such as bandwidth, data format or frequency of a transmission.

In this case, an increased bandwidth, an extended file content, a customized data format or an increased sampling rate for measured values for the communication with the server, with assistance units, with other vehicles or with an infrastructure may mean a safety advantage in hazardous situations, for example. It is possible for more safety-relevant data, such as up-to-date measured values, to be transmitted by a smoke sensor, for example. This allows rescue costs to be saved. Reducing the bandwidth of the vehicle-to-server or vehicle-to-assistance-unit communication in a manner customized to the situation allows other applications to be provided with increased bandwidth. This makes it possible to prevent the same uncustomized basic set of data from always being transmitted to the server or to the assistance units. It is therefore possible to reduce the volume of data which is to be transmitted and to save memory space. In other words, the technical parameters of the communication of the vehicle are customized to the external surroundings of the vehicle.

If, within a short time window, for example, a plurality of vehicles driving ahead at a short distance report the same situation then the vehicle of the emergency call device according to the invention no longer needs to do so. To assess the information landscape and external surroundings correctly, a vehicle must consider not only the information in a report but also the time at which it is received, the repetition rate, the reception strength and the geographical position of the transmitter. It could then use these data to calculate whether it also needs to transmit this report or whether it makes more sense to remain silent. This does not require the setup of a permanent IP connection, but it is nevertheless advantageous.

In line with a further exemplary embodiment of the invention, the nature of the emergency call data is selected from the group comprising data format, content of the data and nature of the conditioning of the data. The parameters of the technical transmission are selected from the group comprising data rate, frequency of update for the data and bandwidth of the connection which has been set up.

By customizing the bandwidth and the data rate to the current situation in which the vehicle finds itself, it is possible to provide more bandwidth and storage capacity for other communication tasks. By way of example, it is also possible to customize the frequency of the updating of the GPS coordinates of the vehicle to the situation in which the vehicle finds itself. In this case, the situation can be recorded by the emergency call device by virtue of a situation analysis on the basis of the data from ambient sensors or, by way of example, digital data from a digital map.

In line with a further exemplary embodiment of the invention, the supplementary information is selected from the group comprising information from a digital map, information from a situation analysis by means of sensors, meteorological information, hazard information from a user of the vehicle, information from other road users and information from a traffic infrastructure.

By way of example, the emergency call device can take a digital map as a basis for ascertaining what hazard potential or what potential for specific situations (Use Cases) there is and, in line with this, can select and customize the nature of the data, such as format and content, for an emergency call or else for other communications. By way of example, data can be sent more frequently before or after a bend than on a straight road. In addition, information about the gas pedal and the brake pedal of a vehicle can be sent to the surrounding vehicles at junctions, for example, which are part of a traffic infrastructure. It is thus possible to make a statement about the behavior and the actions of a driver. Depending on the situation, the data are customized. Another option is to perform a situation analysis, for example, on the basis of the data from ambient sensors or sensors in a detection unit and to customize the data sent and the data rate to the ascertained situation.

Should a vehicle have a technical fault, for example, and send a breakdown call to the server by means of an IP connection, the data rate of the IP connection or else the data rate of the communication link can be customized to the seriousness of the fault or the dangerousness of the situation or to up-to-date data from a smoke detection sensor, for example. This allows increased safety to be achieved by means of the emergency call device.

The communication between the sensors, the controller and the transmitter or receiver in the vehicle takes place by wire or wirelessly, e.g. using short-range communication, such as Bluetooth.

It should be pointed out that every emergency call apparatus may also be a permanently installed apparatus. By way of example, the emergency call device may be a fixed emergency call box on a road.

In line with a further exemplary embodiment of the invention, an emergency call system for vehicles for the network-based transmission of an emergency call is specified. In this case, the emergency call system has an emergency call device according to one of the preceding exemplary embodiments of the invention and also a server. In addition, the server is designed such that the emergency call is forwarded to all the assistance units registered on the server.

In line with a further exemplary embodiment of the invention, the use of an emergency call device in a vehicle is specified.

In line with a further exemplary embodiment of the invention, a vehicle having an emergency call device in accordance with one of the preceding exemplary embodiments is specified.

In line with a further exemplary embodiment of the invention, a method for the network-based transmission of an emergency call from an emergency call device in a vehicle to assistance units is specified. In this case, the method has the following steps: a first connection is set up between the vehicle and a server, emergency call data are sent by the emergency call device to a server via the first connection, the emergency call data are distributed to the assistance units by the server via a second connection, a communication link is set up between the vehicle and an assistance unit, taking the emergency call, via the server. In this case, the first connection is a permanent IP connection and the communication link uses the already existing IP connection.

This inventive method for an automated emergency call can be used to save the otherwise necessary setup time for the communication link between the vehicle and the server. This means that faster assistance can be achieved and rescue costs can be saved.

In line with a further exemplary embodiment of the invention, the communication link has a first and a second section. In this case, the first section exists between the emergency call device and the server, and the second section exists between the server and the assistance unit taking the emergency call. When the emergency call has been taken by an assistance unit, a Voice-over-IP connection is set up at least in the first section of the communication link.

There is thus the option of producing the second section of the communication link between the server and the assistance unit either by means of an IP connection or GSM connection or by means of any other possible physical data transmission link. However, the IP connection which still exists is used between the vehicle and the server in order to be able to set up a voice connection such as a Voice-over-IP connection, more rapidly in the existing IP connection.

In line with a further exemplary embodiment of the invention, the method also has the following steps: the nature of the emergency call data and the parameters of the technical transmission of the emergency call data are customized to supplementary information, wherein the supplementary information corresponds to the external surroundings of the vehicle.

In this case, the external surroundings of the vehicle comprise not only the physical ambient conditions and meteorological circumstances but also the information landscape formed by other vehicles or by transmitting infrastructures. In this case, the physical ambient conditions can ensue by virtue of sensors in a detection unit of the emergency call device, for example. In other words, the volume of data and the content thereof are customized to the respective situation of the vehicle. By way of example, digital data can be used by the emergency call device to ascertain what hazard potential there is on the basis of the road dynamics. It is also possible use other data from the digital map, however.

In line with a further exemplary embodiment of the invention, the nature of the emergency call data is selected from the group comprising data format, content of the data and nature of the conditioning of the data. Similarly, the parameters of the technical transmission are selected from the group comprising data rate, frequency of an update for the data and bandwidth of the connection which has been set up.

This makes it possible to avoid sending redundant information. By way of example, the frequency of the update for a GPS position can be reduced if a minimum speed is not reached.

In line with a further exemplary embodiment of the invention, the method also has the following steps: information about the assistance units is provided for the server in the form of an emergency database by a certification point, and voluntary assistance units are approved for entry into the database by a certification point.

In addition to the assistance units which are already registered, voluntary assistance units can register with the certification point and have themselves entered into the emergency call database. These new, voluntary assistance units are then provided with the information about an accident in the same way as the previously entered assistance units and can sometimes get to the accident location and assist more quickly. This means that assistance can be provided more quickly. In order to prevent misuse of this information, the certification point needs to examine the applicant and check it for prescribed necessary criteria. Only then is entry into the emergency call database possible with an appropriately updated transmission to the server. In the case of an Ecall, the voluntary assistants units may be emergency assistance in companies, doctors, military or retired members of the military, for example. For a Bcall, voluntary assistance units may be local repair shops or private motor vehicle experts or else employees of motor vehicle associations, for example.

Similarly, the certificated entry of voluntary assistance units can be used for the categorized provision of information services. By way of example, it is thus possible for sports facilities for travelers to be provided by sports associations which are assistance units. Similarly, directions to local attractions, for example, can be provided by voluntary additional assistance services. In this case, the certification point can ensure that the entry into the server is not misused.

In line with a further exemplary embodiment of the invention, a program element is specified which, when executed on the processor, instructs the processor to form the steps specified above.

In line with a further exemplary embodiment of the invention, a computer-readable medium which stores a program element is specified, which program element, when executed on a processor, instructs the processor to perform the steps specified above.

In this case, the computer program element may be part of a piece of software, for example, which is stored on a processor of the emergency call device. Similarly, the computer program element can be used in a control unit or in a computer unit which, in combination with the emergency call device, prompts and regulates the automated emergency call. In addition, this exemplary embodiment of the invention comprises a computer program element which uses the invention right from the outset, and also a program element which prompts an existing program to use the invention by virtue of an update.

In addition, it is possible for all the data mentioned in this document to be altered by means of media conversion. The term media conversion quite generally denotes the transfer, transformation or conversion of a file from one file format to another. This applies to a transfer of data between different media and file systems and also to the transfer of data from one storage medium to another. If an emergency call is intended to be sent, for example, the control unit can resort to the detection unit and can be notified of the current vehicle position by the detection unit. For this purpose, the detection unit has a GPS receiver, for example.

In addition, the term media conversion relates to the transformation of data between visual, audio and text formats, and combinational formats thereof. In this case, the media-converted data can be transmitted directly to the receiver selected by the control unit, for example. This allows address information to be made clear to the user of a digital map, for example.

In addition, it should be pointed out that “comprising” and “having” do not exclude other elements or steps, and “a” or “an” does not exclude a large number. Furthermore, it should be pointed out that features or steps which have been described with reference to one of the above exemplary embodiments can also be used in combination with other features or steps from other exemplary embodiments described above.

BRIEF DESCRIPTION OF THE DRAWINGS

The invention is best understood from the following detailed description when read in connection with the accompanying drawings. Included in the drawings are the following figures.

Figure 1:
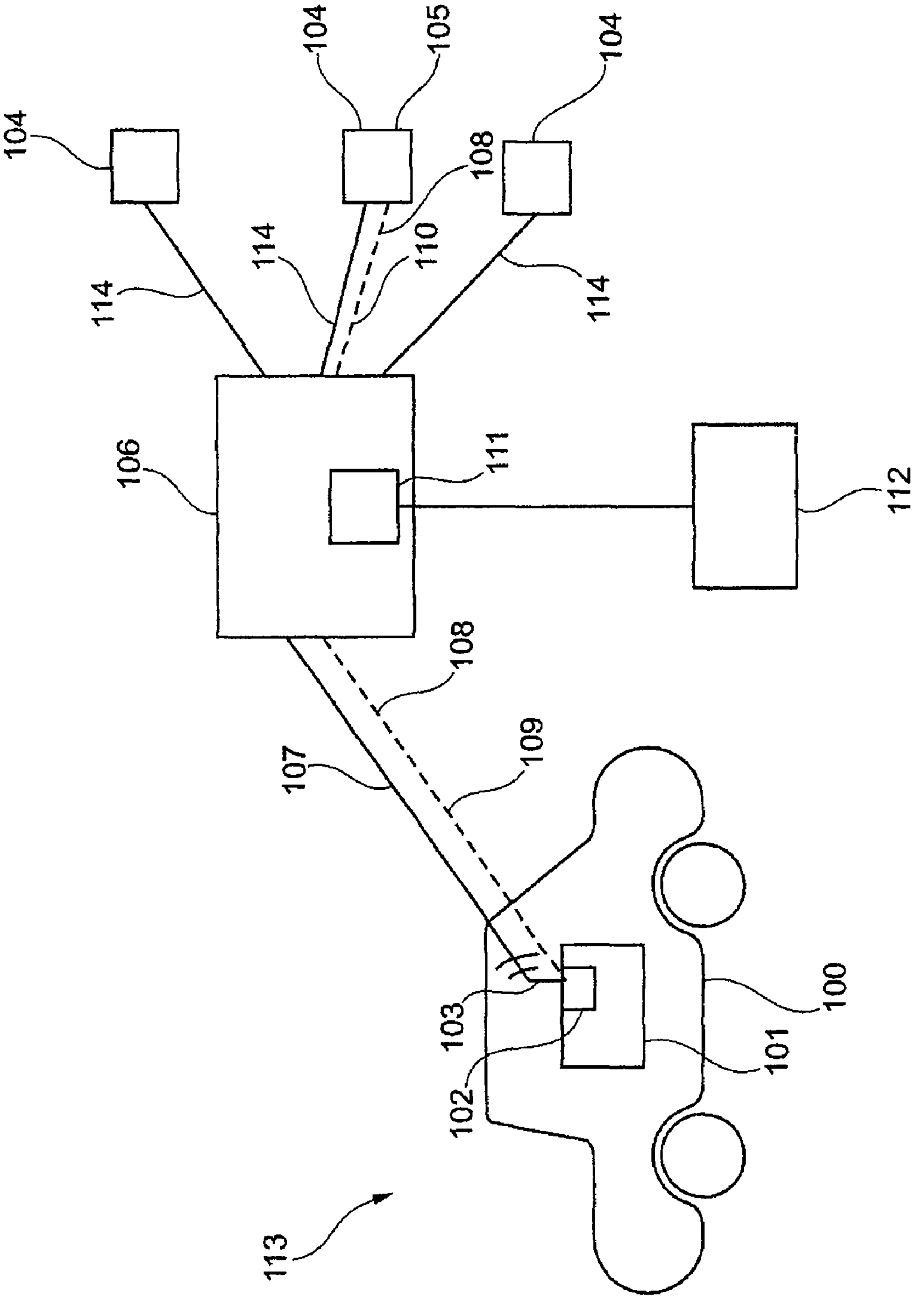
FIG. 1 shows a schematic illustration of an emergency call system based on an exemplary embodiment of the invention.

The illustrations in the figures are schematic and not to scale.

DETAILED DESCRIPTION OF THE PREFERRED EMBODIMENTS

In the descriptions of the figures which follow, the same reference numerals are used for the same or similar elements.

FIG. 1 shows an emergency call system 113 with an emergency call device 101 and a server 106. In this case, the emergency call device is designed for a vehicle for the network-based transmission of an emergency call to assistance units 104. In this case, the transmission is effected directly, that is to say without the emergency call being forwarded by a manned public safety answering point. In this arrangement, the emergency call device comprises a network interface 102 and a transmission unit 103. The network interface and the transmission unit can be used to set up a connection 107 to the server. In this case, the connection 107 is an IP connection which is permanently maintained between the vehicle and the server during an emergency call. The vehicle uses the IP connection to transmit the necessary data, such as position, seriousness of the accident and time of the accident, for example. The server is used to send the message about the emergency call to all the assistance units 104 using respective connections 114 between the server and the assistance unit and in this case also to transmit the relevant information.

When an assistance unit takes the emergency call, a communication link 108 is set up between the assistance unit 105 taking the emergency call and the vehicle 100 via the server. In this case, the connection 114 between the server and the assistance units may be an IP connection or else a GSM connection or else any other physical connection for data transmission, for example. On account of the permanently existing IP connection 107 between the vehicle and the server, the first portion 109 of the communication link 108 can use the existing IP connection and can save setup times. By way of example, the first portion 109 may be in the form of a Voice-over-IP connection between the server and the emergency call device 101. Since it is no longer necessary for routing to be performed by the server, the setup time for the voice connection is superfluous.

FIG. 1 also shows an emergency call database 111 in the server, which database stores the information about the assistance units 104. Similarly, a certification point 112 is shown, by virtue of which voluntary, additional assistance units can be entered into the emergency call database by the certification point following a qualifying check. In this case, these additional assistance units can specify the circumstances under which they need to be notified in the event of an emergency call. Crucial parameters in this case may be time of day, distance to the accident, type of road on which the accident has taken place, or seriousness of the accident. The direct connection to the assistance units means that it is possible for that assistance unit which takes the emergency call to be automatically selected by the assistance unit. It is therefore possible for an emergency call to be taken immediately and independently. Hence, besides shortened connection times it is also possible to implement lower costs and lower susceptibility to error.

Figure 2:
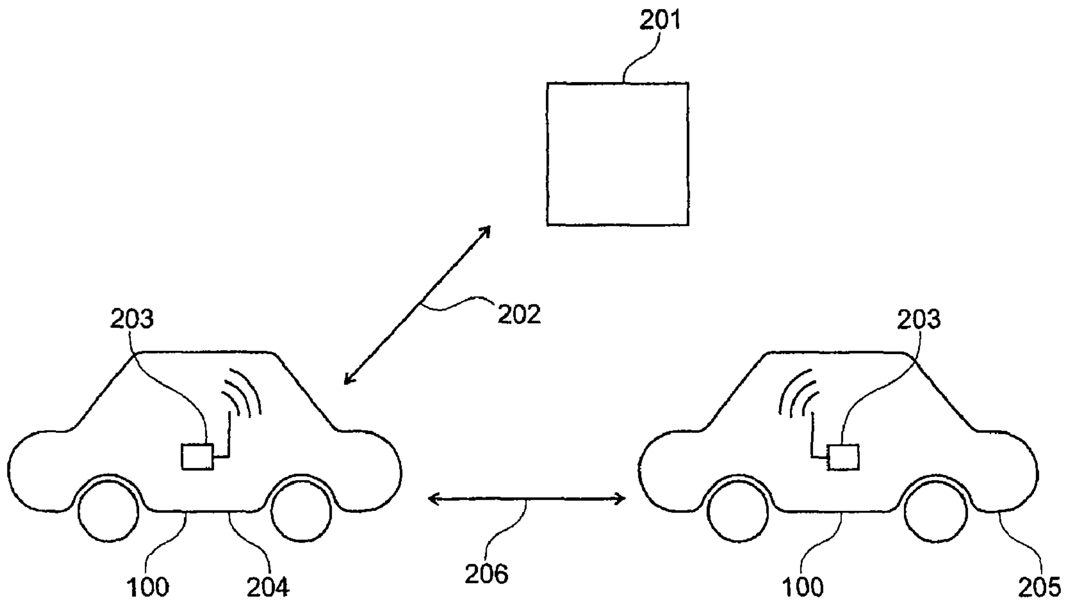
FIG. 2 shows a schematic illustration of communication between vehicles and an infrastructure based on an exemplary embodiment of the invention.

FIG. 2 shows vehicle-to-vehicle communication 206 and vehicle-to-infrastructure communication 202 based on an exemplary embodiment of the invention. In this case, vehicles 100 are shown and also an infrastructure 201, which may also be in the form of a server, for example, as shown by reference 106 in FIG. 1. However, 201 may equally be a traffic infrastructure. In this case, communication units 203 in the vehicles are shown which may be in the form of an emergency call device, for example, as shown by 101 in FIG. 1. The communication units are designed to transmit data between a first and a second vehicle or between a vehicle and the infrastructure. In this case, each communication unit may have a transmission unit, a memory unit and a computation unit. In addition, the memory unit may be designed to supply supplementary information. In addition, the computation unit may be designed to customize the nature of the data and to customize technical parameters of the transmission of the data on the basis of the supplementary information, wherein the supplementary information corresponds to the external surroundings of the first vehicle.

In addition, the communication 202 between the vehicle and infrastructure may be in the form of an IP connection 107, as shown in FIG. 1.

In other words, the format of the data to be sent about the communication 206 and 202 and about the data rate may have been customized to the respective situation of the vehicle. By way of example, a digital map can be taken as a basis for ascertaining what hazard potential there is for specific situations. The bandwidth of the communication link 202 and 206 can then be reduced or increased by the communication units 203. Alternatively, the data traffic can be customized on the basis of sensor values from a detection unit which is in the vehicle. The available bandwidth thereon can be used for other communication tasks of the vehicle.

Figure 3:
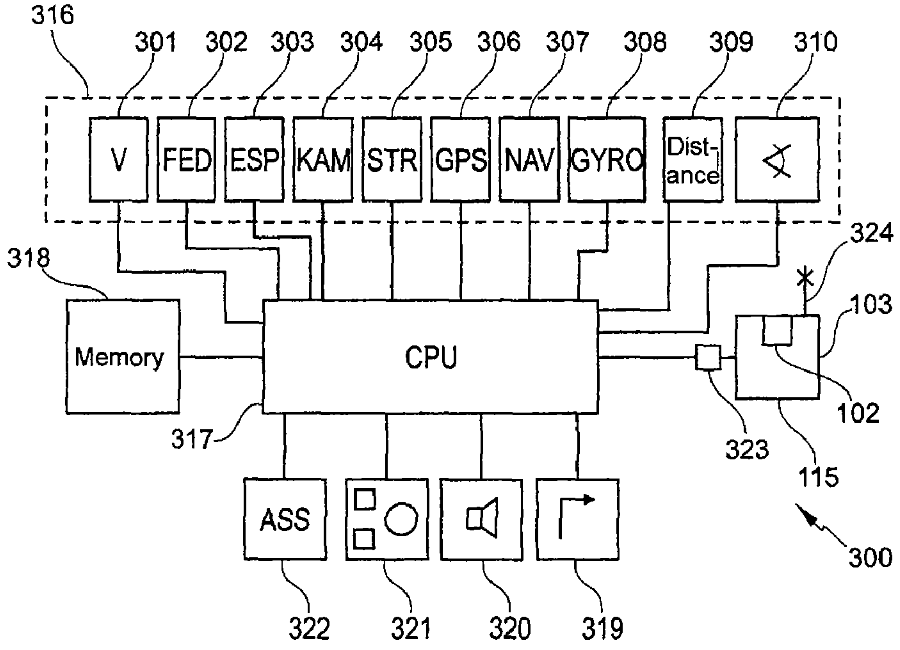
FIG. 3 shows an emergency call device having a detection system based on an exemplary embodiment of the invention.

FIG. 3 shows a system 300 with an emergency call device 103 and a detection unit 316. The data rate and the data format can be customized to the respective situation of the vehicle in line with the invention using values from various sensors for a situation analysis. By way of example, it is possible to use a speedometer 301, a spring excursion sensor 302, an ESP sensor system 303, an optical detector 304, a beam sensor 305, a position-finding unit 306, a navigation unit 307, a direction sensor 308, a distance sensor 309 or a steering wheel rotation angle sensor 310. In this case, a control unit 317 is shown which may be in the form of a CPU. This control unit is able to regulate and control the customization of the data traffic for the emergency call device 103 or the transmission unit (see page 16 above) on the basis of the measured values. A memory 318 can be used to store measured values. In addition, 319 indicates a monitor which can be used to display up-to-date values from the sensors, for example. In addition, an output unit 320 and an input unit 321 are shown as user interface. Similarly, a driver assistance system 322 can be used in the system 300. In this case, an encryption device 323 can increase the security of the communication with other vehicles or infrastructure devices. The antenna 324 can be used to set up the IP connection, which can be maintained permanently, to the server.

Figure 4:
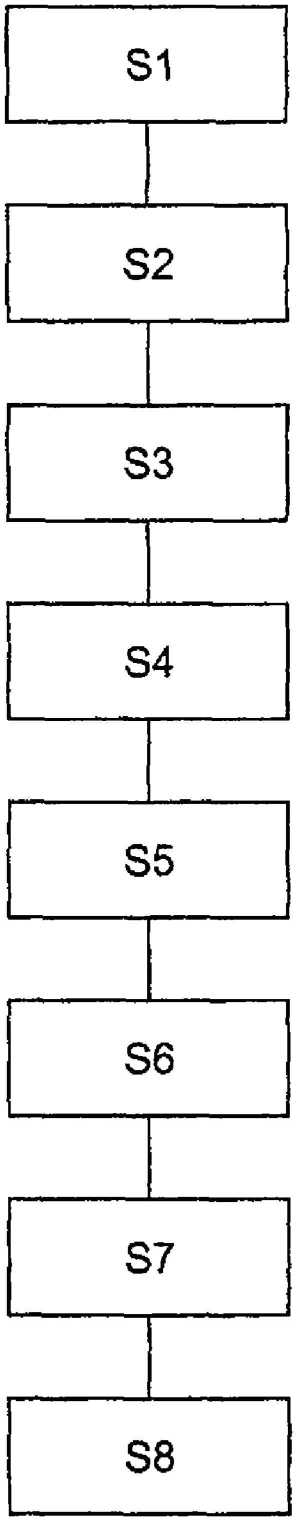
FIG. 4 shows a flowchart for a method based on an exemplary embodiment of the invention.

FIG. 4 shows a flowchart based on an exemplary embodiment of the invention. In step S1, a first connection is set up between the vehicle and a server. In step S2, emergency call data are sent by the emergency call device to a server via the first connection. In step S3, emergency call data are distributed by a server to the assistance units via a second connection, with a communication link being set up between the vehicle and an assistance unit, taking the emergency call, via the server via step S4. In method step S5, a Voice-over-IP connection is set up at least in the first section of the communication link. In method step S6, the nature of the emergency call data and/or the parameters of the technical transmission of the emergency call data are customized to supplementary information. In step S7, information about the assistance units is provided for the server in the form of an emergency call database by a certification point. Method step S8 describes the authorization of voluntary assistance units for entry into the database by a certification point.

The invention claimed is:

1. An emergency call device for a vehicle for a network-based transmission of an emergency call to assistance units, said emergency call device comprising:

a network interface for setting up a permanent IP connection to a server;

a transmission unit for transmitting emergency call data to the server via the connection;

wherein the network interface is also configured to set up a communication link to an assistance unit via the server in an event of said emergency call being taken by said assistance unit; and wherein the communication link uses the IP connection between the emergency call device and the server, wherein a first section of the communication link existing between the emergency call device and the server is a Voice-over-IP connection, wherein transmission of the emergency call to the assistance units does not require a public safety answering point.

2. The emergency call device as claimed in claim 1, wherein the communication link comprises the first section and a second section;

wherein the second section exists between the server and the assistance unit taking the emergency call.

3. The emergency call device as claimed in claim 1, wherein the assistance unit taking the emergency call is selected by a direct, independent taking of the emergency call by the assistance unit.

4. The emergency call device as claimed in claim 1, wherein the emergency call data are selected from the group consisting of a current and historical position of the vehicle, a nature of an accident, a seriousness of an accident, a time of an accident, a number of occupants, individual information from the occupants, biometric information, information relating to a technical fault, error diagnosis information, and measured values from sensors in the vehicle.

5. The emergency call device as claimed in claim 1, wherein a nature of the emergency call data and parameters of the transmission of the emergency call data are customized to supplementary information; and wherein the supplementary information corresponds to external surroundings of the vehicle.

6. The emergency call device as claimed in claim 5, wherein the nature of the emergency call data is selected from the group consisting of data format, content of the data, and nature of a conditioning of the data; and wherein the parameters of the transmission are selected from the group consisting of data rate, frequency of update for the data, and bandwidth of the connection which has been set up.

7. An emergency call system for vehicles for the network-based transmission of an emergency call, said emergency call system having:

an emergency call device as claimed in claim 1;

a server;

wherein the server is configured to forward the emergency call to all of the assistance units registered on the server.

8. A method for network-based transmission of an emergency call from an emergency call device in a vehicle to assistance units, said method comprising the following steps:

establishing a first permanent IP connection between the vehicle and a server;

sending emergency call data by an emergency call device to a server via the first connection;

distributing emergency call data to the assistance units by the server via a second connection, wherein distribution of the emergency call data to the assistance units does not require a public safety answering point;

establishing a communication link between the vehicle and an assistance unit, taking the emergency call, via the server, wherein the communication link uses the permanent IP connection; and establishing a Voice-over-IP connection at least in a first section of the communication link that exists between the emergency call device and the server.

9. The method as claimed in claim 8, wherein the communication link comprises the first section and a second section, wherein the second section exists between the server and the assistance unit taking the emergency call.

10. The method as claimed in claim 8 further comprising the step of:

customizing a nature of the emergency call data and parameters of the transmission of the emergency call data to supplementary information, wherein the supplementary information corresponds to external surroundings of the vehicle.

11. The method as claimed in claim 8 further comprising the step of:

providing information about the assistance units for the server in the form of an emergency call database by a certification point; and approving voluntary assistance units for entry into the database by a certification point.

12. A non-transitory computer-readable medium embodied with a computer program element which, when executed on a processor, instructs the processor to perform the following steps:

setup of a first permanent IP connection between a vehicle and a server;

sending of emergency call data by an emergency call device to a server via a first connection;

distribution of the emergency call data to assistance units by the server via a second connection;

setup of a communication link between the vehicle and an assistance unit, taking the emergency call, via the server; and establish a Voice-over-IP connection at least in a first section of the communication link that exists between the emergency call device and the server, wherein the communication link uses the IP connection, wherein transmission of the emergency call to the assistance unit does not require a public safety answering point.

* * * * *